JAMES DOYLE.

Improvement in Blast-Devices for Facilitating the Welding of Ends of Tubes.

No. 126,880.  Patented May 21, 1872.

126,880

UNITED STATES PATENT OFFICE.

JAMES DOYLE, OF NEW YORK, N. Y., ASSIGNOR TO HIMSELF AND SETH DREW, OF KINGSTON, MASSACHUSETTS.

IMPROVEMENT IN BLAST DEVICES FOR FACILITATING THE WELDING OF ENDS OF TUBES.

Specification forming part of Letters Patent No. 126,880, dated May 21, 1872.

*To all whom it may concern:*

Be it known that I, JAMES DOYLE, of the city and county of New York, in the State of New York, have invented certain new and useful improvements in the method or process of treating metals, especially adapted for closing and welding tube ends; and I do hereby declare that the following is a full and exact description thereof.

By closing and welding I mean rounding together and effectually stopping the end of tubes. Iron tubes thus prepared are used in steam-heaters, and have come to be important articles of manufacture. The welding of such thin and rapidly cooling iron with ordinary appliances requires much skill, and to close and weld an end usually requires two heats, each as hot as the material will bear.

I have devised a simple means by which I am enabled to close and weld tube ends successfully and certainly at a single heat.

I will first describe what I consider the best means of carrying out my invention, and will afterward designate the point which I believe to be new therein.

The accompanying drawing forms a part of this specification.

Figure 1:
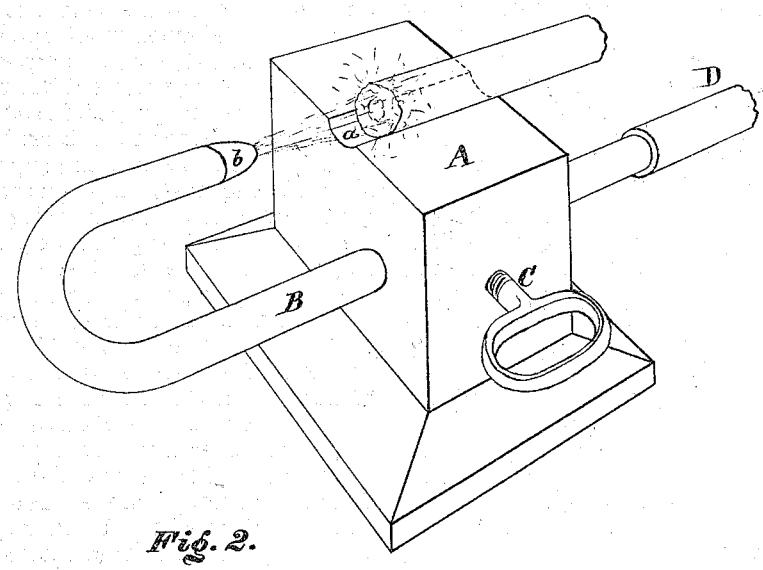
Figure 2:
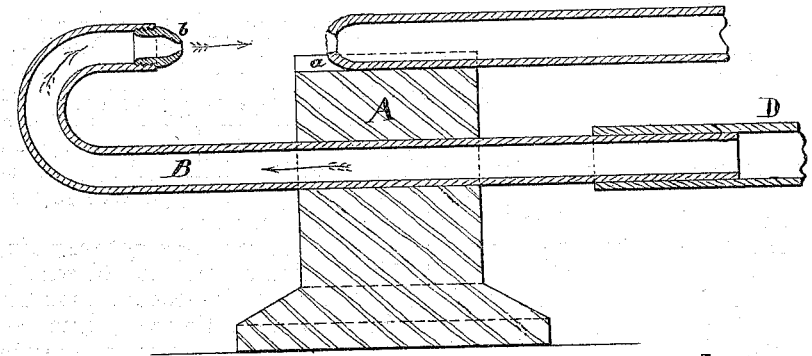

Figure 1 is a perspective view of an anvil and tube adapted for use according to my invention, and Fig. 2 is a sectional view of the same.

Similar letters of reference indicate like parts in both figures.

A is an anvil or block of iron faced with steel on the upper surface where it is subjected to wear. It is provided with a deep half-round groove, as indicated by $a$, in which to lay the heated ends of the tubes to be hammered in the act of welding. This anvil does not differ materially from the anvils which have been long used for the purpose of joining the ends of tubes, except in the following: There is a hole below, through which passes a tube, B, and there is a pinching-screw, C, by which the tube B may be very firmly held in any desired position. The tube B receives a strong blast of wind from a blowing-machine, not represented, through the connection D, which allows the tube B to be adjusted backward and forward therein at pleasure. The wind, in passing through the anvil in the interior of the adjustable part B, is thrown backward and against the end of the heated tube, the tube B being recurved upon itself, and provided with a small nozzle, $b$, for the purpose of properly directing the concentrated blast in the proper direction and in proper force. By partially turning the curved tube B around, it may be set out of the way in doing any work in which it is not required. The arrangement allows me to adjust the blowing-nozzle at various distances, and to swing the hammer at various angles as may be required for the different thicknesses, diameters, or qualities of the tubes to be welded. In order to allow the hot tube to overhang the edge of the anvil, and be struck by the hammer with a very horizontal motion, I slacken the pinching-screw C, and draw the curved tube B out so as to hold the nozzle $b$ further away from the anvil A. In order to concentrate the blast more directly in a single spot, whenever the size of the tube and the nature of the blows required will allow the approach of the nozzle $b$, I slacken the set-screw C and move the tube B, so that the nozzle $b$ stands nearer to the work, and consequently nearer to the anvil A.

I have already partly explained, and may repeat, how I change the elevation of the nozzle. It is simply by twisting the pipe B around. This is done with great facility after slackening the screw C. When the pipe B is adjusted in the position desired, I tighten the pinching screw C, and the apparatus is now ready to serve for a long time.

It may not be necessary to explain my theory of the action of the blast of wind. I believe that the intensely-heated iron in the form of a thin tube, presenting very great surface, and receiving the blast in the manner here shown, burns up a small portion of its substance; more in consequence of the blast than would otherwise be the case; and the oxidizing of such small part of the material yields heat to maintain the high temperature of the remainder. Whether I am correct in this, or whether the success is due entirely to the prompt removal of the scale, or like subordinate functions, I am certain from experiment that I can weld easier with this apparatus than without it.

I do not confine myself to the precise forms or proportions herein shown, as the proportions may be varied within very wide limits.

I am aware that a British patent to J. Weems, in 1856, suggests blowing upon hot iron with intensely heated air with a view to maintain its temperature by the heat thereby conveyed to it; and also that Henry Bessemer and others have shown that the blowing of cold air into a mass of melted iron may maintain its temperature by the combustion of carbon and of some of the iron itself under such circumstances.

I do not claim to have been earlier than either, or to conflict with either of these processes; but I believe I am the first to discover that hot wrought-iron may be kept at a high temperature by blowing upon it with cold air, and that I am certainly the first to have practically devised any means for utilizing such discovery.

Having now fully described my invention, what I claim as new, and desire shall be considered as my claim in this patent, is—

The adjustable bent tube B, arranged in the anvil A $a$ and adapted to serve therewith, and with the connection D to a blowing means for supplying cold air to blow upon the iron while worked upon the anvil, as and for the purposes herein specified.

JAMES DOYLE.

Witnesses:
C. C. LIVINGS,
WM. C. DEY.